(12) United States Patent
Günther et al.

(10) Patent No.: US 12,194,853 B2
(45) Date of Patent: Jan. 14, 2025

(54) ASSEMBLY FOR A VEHICLE

(71) Applicant: Kirchhoff Automotive Deutschland GmbH, Attendorn (DE)

(72) Inventors: Alexander Günther, Olpe (DE); Dominik Tentscher, Hemer (DE); Antonio Turco, Sundern (DE); Michael Weige, Finnentrop (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 317 days.

(21) Appl. No.: 17/915,057

(22) PCT Filed: May 4, 2021

(86) PCT No.: PCT/EP2021/061752
§ 371 (c)(1),
(2) Date: Sep. 27, 2022

(87) PCT Pub. No.: WO2021/224276
PCT Pub. Date: Nov. 11, 2021

(65) Prior Publication Data
US 2023/0166597 A1    Jun. 1, 2023

(30) Foreign Application Priority Data
May 5, 2020    (DE) .................... 10 2020 112 133.4

(51) Int. Cl.
*B60R 11/02* (2006.01)
*B60K 35/60* (2024.01)
(Continued)

(52) U.S. Cl.
CPC .......... *B60K 35/60* (2024.01); *B60R 11/0229* (2013.01); *B62D 25/145* (2013.01);
(Continued)

(58) Field of Classification Search
None
See application file for complete search history.

(56) References Cited

U.S. PATENT DOCUMENTS

| 8,950,794 B2 | 2/2015 | Lenkenhoff |
| 9,409,606 B2 | 8/2016 | Eshima |

(Continued)

FOREIGN PATENT DOCUMENTS

| DE | 102016004156 A1 | 9/2016 |
| DE | 102019113312 A1 | 12/2019 |

(Continued)

OTHER PUBLICATIONS

Pending U.S. Appl. No. 17/912,589, filed Sep. 19, 2022, inventor Lagin, applicant Kirchhoff Automotive Deutschland GmbH.

(Continued)

*Primary Examiner* — Joseph D. Pape
(74) *Attorney, Agent, or Firm* — Polson Intellectual Property Law P.C.; Margaret Polson; Christopher Sylvain

(57) ABSTRACT

An assembly for a vehicle comprising a crossmember, which is provided for connecting to two pillars lying opposite each other with respect to the x-y plane of the vehicle; a mounting that is connected to the crossmember, protrudes therefrom in the radial direction, and has two mounts, which are mutually spaced in the y direction, and end-face connection means; and a panel-shaped instrument which is connected to the connection means of the mounting at a distance to the upper closure thereof and which is held such that the operating surface of the instrument faces the passenger compartment of the vehicle in the x direction. Each of the two mounts is designed in the form of a half shell which are arranged such that the opening side thereof faces in the y direction, wherein the two limbs of the mounts designed as half shells are arranged on the x-y plane, the web connecting said limbs is arranged on the y-z plane, and each of the mounts has at least (Continued)

one predetermined bending point, which is provided by the geometry of the mount, between the two connection points of the mount, said mounts bending at the predetermined bending point in the z and/or y direction in the event of a load (x direction).

14 Claims, 3 Drawing Sheets

(51) Int. Cl.
  *B62D 25/14* (2006.01)
  *B60K 35/22* (2024.01)
  *B60K 35/50* (2024.01)
  *B60R 11/00* (2006.01)

(52) U.S. Cl.
  CPC .............. *B60K 35/22* (2024.01); *B60K 35/50* (2024.01); *B60K 2360/652* (2024.01); *B60K 2360/816* (2024.01); *B60R 2011/0005* (2013.01)

(56) References Cited

U.S. PATENT DOCUMENTS

| | | |
|---|---|---|
| 9,446,799 B2 | 9/2016 | Franzpötter |
| 9,598,100 B2 | 3/2017 | Lenkenhoff |
| 9,764,764 B2 | 9/2017 | Irle |
| 10,005,495 B2 | 6/2018 | Töller |
| 10,577,025 B2 | 3/2020 | Michler |
| 10,882,559 B2 | 1/2021 | Gündogan |
| 11,142,248 B2 | 10/2021 | Günther |
| 11,148,623 B2 | 10/2021 | Günther |
| 11,235,720 B2 | 2/2022 | Höning |
| 11,292,409 B2 | 4/2022 | Töller |
| 11,505,146 B2 | 11/2022 | Weige |
| 2004/0212220 A1 | 10/2004 | Riley |
| 2005/0127253 A1* | 6/2005 | Kim .......................... H04N 5/64 248/176.1 |
| 2019/0344385 A1 | 11/2019 | Töller |
| 2019/0375342 A1* | 12/2019 | Mullen ............... B60R 11/0235 |
| 2022/0009435 A1 | 1/2022 | Günther |
| 2022/0024399 A1 | 1/2022 | Tlauka |
| 2022/0258684 A1 | 8/2022 | Günther |
| 2022/0281532 A1 | 9/2022 | Tentscher |
| 2022/0289304 A1 | 9/2022 | Weige |
| 2022/0297524 A1 | 9/2022 | Günther |
| 2022/0314912 A1 | 10/2022 | Töller |
| 2022/0363211 A1 | 11/2022 | Günther |
| 2023/0039843 A1 | 2/2023 | Gündogan |

FOREIGN PATENT DOCUMENTS

| | | |
|---|---|---|
| DE | 202020100757 U1 | 2/2020 |
| EP | 2740628 B1 | 1/2018 |
| EP | 3045340 B1 | 2/2019 |
| JP | 2008290508 A | 12/2008 |
| JP | 2013082362 A | 5/2013 |
| WO | 2019231459 A1 | 12/2019 |

OTHER PUBLICATIONS

Pending U.S. Appl. No. 17/914,465, filed Sep. 26, 2022, inventors Günther et al., applicant Kirchhoff Automotive Deutschland GmbH.
Pending U.S. Appl. No. 18/008,284, filed Dec. 5, 2022, inventors Günther et al., applicant Kirchhoff Automotive Deutschland GmbH.
International Search Report dated Sep. 14, 2021 in parent international application PCT/EP2021/061752.
Written Opinion of the International Searching Authority dated Sep. 14, 2021 in parent international application PCT/EP2021/061752.

* cited by examiner

ASSEMBLY FOR A VEHICLE

BACKGROUND

The present disclosure relates to an assembly for a vehicle, comprising a crossmember, which is provided for connecting to two pillars lying opposite each other with respect to the x-z plane of the vehicle; a mounting that is connected to the crossmember, protrudes therefrom in the radial direction, and has two mounts, which are mutually spaced in the y direction, and end-face connection means and a panel-shaped instrument, in particular a display, which is connected to the connection means of the mounting at a distance to the upper end thereof and which is held such that the operating surface of the instrument faces the passenger compartment of the vehicle in the x direction.

Increasingly larger display and operating units—displays—are being installed in motor vehicles. These are panel-shaped instruments. In many cases, these are located as a central display approximately in the middle in the region of the dashboard. These displays are oriented with their display interface or user interface into the passenger compartment of the vehicle so that the driver and front passenger can read the information located thereon. In most cases, such displays are also provided as an input unit. They are then touch sensitive. Because of the size of the displays, the limited space available in many cases, and also for reasons of comfort and ergonomics, such displays cannot always be installed in an integrated manner in the dashboard panel, but protrude beyond the upper end of the dashboard. Designs are also known in which displays of this type that protrude beyond the dashboard in the use position can be lowered.

Panel-shaped instruments of this type, especially if they protrude completely or partially over the upper end of the dashboard, are to be mounted in such a way that they do not increase the risk of injury to the vehicle occupants in the event of an accident. For this purpose, it has been proposed in EP 3 045 340 B1 that such a display be arranged on a support element that extends on the rear side with respect to the display. The support element is embodied as angled. The display is connected to the limb extending in the vertical direction (y-z direction). On the outside with respect to the angled configuration, the two limbs are connected by a metallic connecting plate formed from metallic leaf spring material. The support element is designed so that when a load exceeding a certain force is applied to the upper region of the display, the support element breaks and the display folds over in the direction of travel. In the case of such panel-shaped instruments, at least one section of which protrudes from the surface of the dashboard, it also has to be ensured that the mounting withstands without damage a load that acts on it, for example when a person grasps the top of the display to help lift themselves up, therefore uses it as a handle, and pulls themselves up thereon. Such cases of load, also referred to as misuse, must not result in damage or destruction of the mounting.

A mounting arrangement of a display device for a motor vehicle interior is known from DE 10 2016 004 156 A1. In this mounting arrangement, the display device is located in front of the steering wheel. The display device is released from its mounting arrangement when the steering column is adjusted upwards as a result of an accident. As a result of this steering column movement, the display device is released from the mounting and, since it is no longer connected to a buttress, no longer poses a risk of injury.

Another mounting for a display in a motor vehicle is known from JP 2008-290508 A. This mounting comprises two individual mounts which are arranged at a distance from one another and which are connected at one end to the dashboard crossmember. The mounts protrude upwards from the dashboard crossmember in the z direction. This is considered necessary in order to be able to provide sufficient energy absorption in the available installation space. In addition to a limb extending in the z direction, one end of which is connected to the crossmember, such a mount includes a V-shaped mount part formed at an angle thereon, as a result of which this section of the mount is made N-shaped in a side view. An audio unit that is integrated in the dashboard is connected to the shorter, parallel mount limb, which also extends in the z direction. As a result of this design of the mounts, the distance between the two limbs extending in the z direction is reduced when a force acts on the audio unit in the x direction. The accompanying deformation work absorbs energy. In order to maintain a vertical alignment of the audio unit connected thereon even in case of deformation, a predetermined bending point is incorporated by weakening the material between the connection of the limb of the mount carrying it and the inclined connecting web. This mount is used to mount an audio system that does not protrude over the top of the dashboard. Therefore, this mounting does not have to meet the requirements that are placed on a display projecting over the surface of the dashboard.

JP 2013-082362 A discloses a mounting for a panel-shaped instrument, comprising one or more mounts. The mounts are formed in two parts and are connected to one another with a friction lock by means of a screw. The mount connected to the crossmember has a slot in which the screw is guided, so that the two parts are displaceable in relation to one another. In case of a crash, the mount is pushed together due to the force action.

DE 10 2019 113 312 A1 discloses a mounting for an interior panel of a motor vehicle.

US 2004/0212220 A1 discloses an energy absorption support that comprises additional reinforcement elements within its two-shell structure and still satisfies the energy absorption requirements in case of a crash.

U.S. Pat. No. 9,409,606 B2 discloses a crossmember that is weakened by means of a slot so that it bends in case of a crash.

EP 3 045 340 B1 discloses a mounting for a panel-shaped instrument, the mounts of which are formed as sheet metal having meandering predetermined bending points.

According to the legal requirement for the mounting of such a panel-shaped instrument, such as a display, such a mounting has to be designed to be soft enough so that the maximum permissible acceleration acting on the head of an occupant is not exceeded. On the other hand, such a mount has to meet the misuse requirements without the mount being plastically deformed or destroyed. Approximately 300 N are assumed as misuse forces, wherein above all forces in the x direction (both directions) and in the z direction (directed downwards) are relevant.

SUMMARY

Proceeding from this background, one aspect of the present disclosure is based on refining an assembly for a vehicle of the type mentioned at the outset in such a way that it not only meets the requirements for occupant safety, but is also suitable for carrying panel-shaped instruments, such as displays, which are arranged at least with a section above the top of the dashboard, and thus also meets the misuse requirements, but which can also be used in cramped installation conditions.

This is achieved by an assembly of the type mentioned at the outset, in which the two mounts are each designed in the form of a half shell which are arranged such that the opening side thereof faces in the y direction, whereby the two limbs of the mounts designed as half shells are arranged on the x-y plane, the web connecting said limbs is arranged in the y-z plane, and each of the mounts has at least one predetermined bending point, which is provided by the geometry of the mount, between the two connection points of the mount, said mounts bending at the predetermined bending point in the z and/or y direction in the event of a load (x direction).

The directional or plane orientation (x, y, z) used in the context of this disclosure is that typically used in vehicles. Accordingly, the x direction corresponds to the longitudinal extension of the vehicle, the y direction to the transverse direction thereto, and the z direction to the vertical direction. In the case of the planes referred to in conjunction with the spatial position of the limbs of the two cords—the y-z plane and the x-z plane—these are not to be understood strictly geometrically. Rather, the spatial position can deviate from the strictly geometrical plane as long as the projection of the actual spatial position (ACTUAL spatial position) into the strictly geometrical plane maps the larger part of the actual spatial position. The deviation is preferably not greater than ±40°. The same applies to the direction specifications.

The two mounts of this assembly are designed as half shells. The two half shells are arranged in the assembly so that the opening side of the half shells is arranged facing in the y direction. According to one example embodiment, it is provided that the opening side of the half shells is arranged facing towards one another. Each half shell has two limbs located in the x-y plane and a web connecting these limbs. The web is arranged in the y-z plane.

In order to ensure that the display can be adjusted by bending at a defined point in the event of an acceleration acting on it that exceeds a certain amount, the mounts have at least one predetermined bending point that bends in such a case. This is designed so that when an accident-related shearing load acts on the upper end of the display (load direction in the x direction), the mounts bend in the z and/or y direction. The bending direction of the mount thus runs in a direction transverse to the acceleration acting thereon.

The mounts are connected to the crossmember so that they protrude in the x direction. As a result, the crossmember, which is stable in any case, represents the buttress against which an acceleration acting on the display, which is to be absorbed by bending, results in the desired adjustment thereof and energy absorption. The upper end of the panel-shaped instrument is located at a distance in the z direction from the upper end of the mount. If the display is located protruding as far as possible from the top of the dashboard with respect to its height, the mounts will be connected to the lower region of the display. Acceleration acting on the display, typically caused by the striking of the head of a vehicle occupant in case of an accident, results in a bending moment of the mounts, so that they bend as the provided predetermined bending point when the corresponding force is applied. The predetermined bending point is provided by the geometry of the mount in the region of the predetermined bending point. If the mount is to bend in the z direction, therefore around a bending axis extending in the y direction, this can be adjusted via the height of the web in the z direction. The bending direction will also be specified by the geometry. Bending is supposed to occur upwards in the z direction. For this purpose, such a mount has a concave shape with respect to its upper-side geometry in the region of the predetermined bending point, wherein the bending axis extending in the y direction is arranged in the region of the apex of this shaped structure. Typically, the course of the lower limb in its x-y plane follows the course of the upper limb, at least in the region of the predetermined bending point. It is of interest that such a geometric specification for providing the desired bending point reacts to a load in the x direction with a corresponding acceleration or force acting on it, but not in the event of a tensile force acting on it in the event of a misuse, for example if an occupant grasps the upper edge of the displays to stand up on it.

If a flexibility in the case of an accident is also to be provided when an acceleration or force acts on the panel-shaped instrument, which is coupled into it above the height of the mounts, it is provided that the mounts additionally have a predetermined bending point at which the mount sections closer to the display with respect to the predetermined bending point bend in or out in the y direction in relation to the mount sections of the mount located on the other side with respect to the predetermined bending point. This can be achieved by a flexure with an offset in the y direction in the two mounts, by which the two mount sections separated by the flexure are offset from one another in the alignment of their longitudinal extension in the y direction and the mount sections offset by the flexure do not overlap in their alignment in the y direction. In the event of a load acting on such a mount in the x direction, the flexure acts as a hinge. The axis of the flexure typically runs in the z direction. In such a configuration, the mount section carrying the connection means can be inclined counter to the offset direction of the flexure, due to which this mount section has a certain specification for activating the predetermined bending point. Depending on the design of the mount, angles of inclination between 16° and 18° relative to the geometric x direction are sufficient. The other mount section on the crossmember connection side does not necessarily have to have such a specification. The flexure is preferably located outside the center of the longitudinal extension of the brackets, specifically offset in the direction of the connection of the mount to the crossmember. The mount section carrying the panel-shaped instrument is then longer and acts on the predetermined bending point with a correspondingly larger lever. Thus, the reaction of the predetermined bending point can also be influenced via the length of this mount section.

The design of such a mount is expedient if it has a higher flexural rigidity in a section before the actual connection to the crossmember than in the adjacent mount section having the at least one predetermined bending point. In this way, the bending buttress is displaced away from the crossmember in the direction of the predetermined bending point.

The design of the mounts as half shells having their limbs formed at an angle on a web allows individual adaptation to different requirements, since the stiffness or the bending behavior can be influenced in a simple manner by the respective limb height or limb width. Other measures for influencing the bending behavior, such as a different material thickness, the formation of a different metal structure and the like are also possible. It is also conceivable to introduce one or more recesses into the web connecting the limbs.

It is also to be emphasized in the case of this mounting that it only has to be connected to the dashboard crossmember. This is also the case in one preferred example embodiment. This mounting is therefore suitable for forming an assembly of the type mentioned, in which only relatively little installation space is available.

BRIEF DESCRIPTION OF THE DRAWINGS

The present disclosure is described hereinafter on the basis of an example embodiment with reference to the appended figures, wherein.

DETAILED DESCRIPTION

Figure 1:
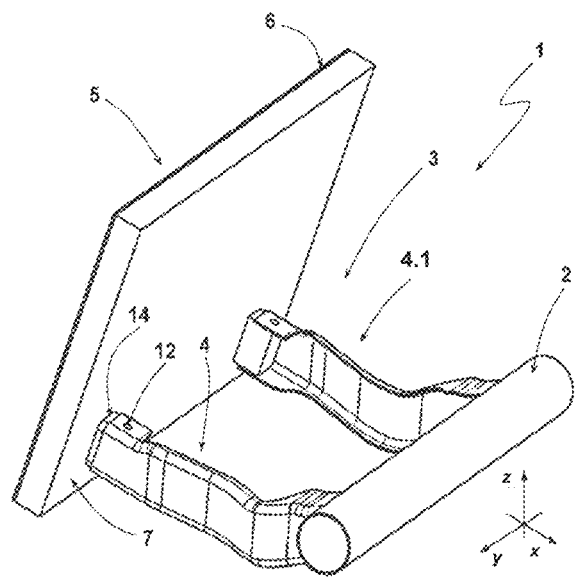
FIG. 1 shows a perspective view of an assembly for a vehicle comprising a crossmember and a display connected thereon by means of a mounting.

An assembly 1 for a vehicle comprises a dashboard crossmember 2, only a portion of which is shown in FIG. 1. For the sake of simplicity, the crossmember 2 is embodied as a tube in the figure. It can also have other cross-sectional geometries, and can also be assembled from, for example, two shells to create the hollow chamber profile desired for such a crossmember. In addition to the crossmember 2, the assembly 1 includes a mounting 3. This has two mounts 4, 4.1. The two mounts 4, 4.1 are formed mirror-symmetrical to the y-z plane. The mounts 4, 4.1 are connected at one end to the crossmember 2, specifically by a welded bond. The welded bond follows the contour of the mount 4, 4.1 on the outside. Both the crossmember 2 and the mounts 4, 4.1 are steel parts. The mounts 4, 4.1 are arranged at a distance from one another in the y direction. At their end opposite to the crossmember 2, the mounts 4, 4.1 of the mounting 3 are connected to the rear side of a display 5 as an example of a panel-shaped instrument. As can be seen in FIG. 1, the mounts 4, 4.1 are connected to the display 5 in its lower half at a small distance from the lower end. The display 5 is thus connected to the mounting 3 off-center in the vertical direction (z direction). The distance of the mounts 4, 4.1 in the z direction from the upper end 6 of the display 5 is significantly greater than the distance of the mounts 4, 4.1 from its lower end 7.

As explained below with reference to the mount 4, the mounts 4, 4.1 have predetermined bending points so that when an acceleration acts on the upper end 6 of the display 5, for example due to the impact of the head of an occupant, the display 5 bends with its upper end 6 in the direction of the crossmember 2 to avoid or reduce a risk of injury. If an impact on the display 5 from the direction of the passenger compartment, in which its user interface faces, acts less as a tilting load, which couples a bending moment into the respective mount, but more as a load in the x direction over the height of the display 5, the mounts 4, 4.1 bend, due to which the distance between the display 5 and the crossmember 2 is reduced. The mounts 4, 4.1 are thus used for energy absorption and are designed so that they do not break in case of bending.

The mounts 4, 4.1 are spaced apart relatively far apart from one another in the y direction with respect to the extension of the display 5 in this direction and are only connected to the lateral end of the display 5 facing in the y direction at a small distance from this lateral end. The mounts 4, 4.1 protrude from the crossmember 2 in the x direction.

The following explanations, in which the mount 4 is described, apply equally to the mount 4.1, which is mirror-symmetrical to the mount 4.

Figure 5:
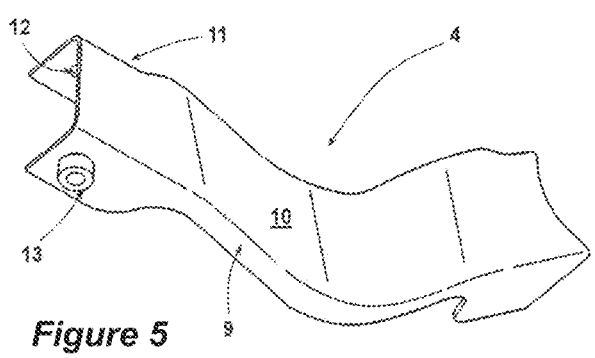
FIG. 5 shows a perspective view of the mount of the preceding figures from a different perspective.

The mount 4 is designed as a half shell and has an upper limb 8 and a lower limb 9 spaced apart from this in the z direction. The two limbs 8, 9 are connected to one another by a web 10. In the illustrated example embodiment, no passages are introduced into the web 10. The two limbs 8, 9 are located in the x-y plane. The web 10 connecting the limbs 8, 9 is located in the y-z plane. The limbs 8, 9 border on the web 10, forming a radius. The radius is a result of the production process of the mount 4, which is manufactured as a stamped and bent part produced from a steel plate. The horizontally lying limbs 8, 9 are widened in their end section on the connection side 10 to which the display 5 is connected (see FIGS. 3 and 4) so that they can be equipped with connection means in order to be able to connect the display 5 thereon. In the example embodiment shown, these connecting means are circular passages 12, 12.1 for passing through a screw fastener (not shown in the figures). As can be seen from FIG. 5, a press-in nut 13 is connected to the lower side of the relevant widening of the lower limb 9, in the internal thread of which a screw fastener can be fixed, wherein the shaft thereof reaches through the passage 12 of the upper limb 8 and a connection part 14 of the display 5.

Figure 2:
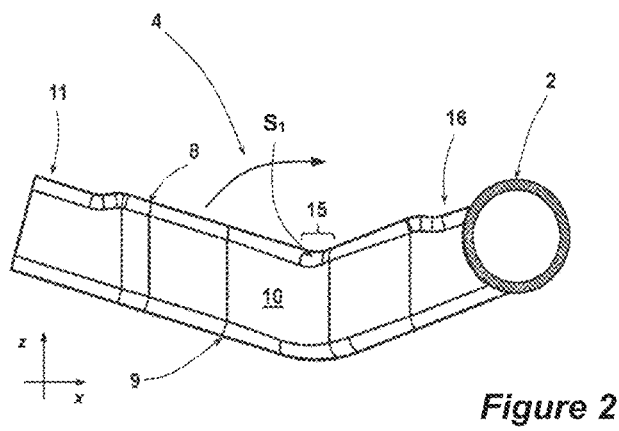
FIG. 2 shows a side view of the left mount of the mounting in FIG. 1.

The geometry of the mount 4 is designed so that it has a first predetermined bending point $S_1$ through which the mount 4 bends in the z direction when an accident-related acceleration acts on the upper end 6 of the display 5, as indicated by the arrow in FIG. 2. The predetermined bending point $S_1$ is provided by a concave section 15 of the course of its upper limb 8. The concave design can be seen in the side view of FIG. 2 by the spatial position of the upper limb 8 changing in the x direction. When the mount 4 bends, the crossmember 2 lying behind the predetermined bending point $S_1$ in the x direction with respect to the direction of impact acts as a buttress. In the mount section providing the crossmember connection 16, the limbs 8, 9 have a greater width (see FIGS. 3 and 4), which width decreases in the direction of the predetermined bending point $S_1$ along a curved contour. Due to the increased width of the limbs 8, 9, the joint surface for joining the mount 4 to the crossmember 2 is enlarged on the one hand. At the same time, this increases the higher flexural rigidity of the mount 4 in the region of its crossmember connection 16 to define the predetermined bending point $S_1$, at which the connection-side mount section bends in or out in relation to the other mount section for energy absorption. The concave section 15 of the mount 4 in its upper limb 8, in the apex of which the predetermined bending point $S_1$ is located, is provided in the illustrated example embodiment by a transition of the inclination of the mount 4 in its section having the crossmember connection 16 in comparison to the inclination of the mount section having the connection side 11. As can be seen from the side view in FIG. 2, these two mount sections are arranged in a V-shape relative to one another, due to which the bending direction is predetermined upwards in the z direction. In this respect, this geometry of the mount 4 provides a specification with regard to the definition of the bending direction (z direction). The bending axis of the predetermined bending point $S_1$ extends in the y direction.

Figure 3:
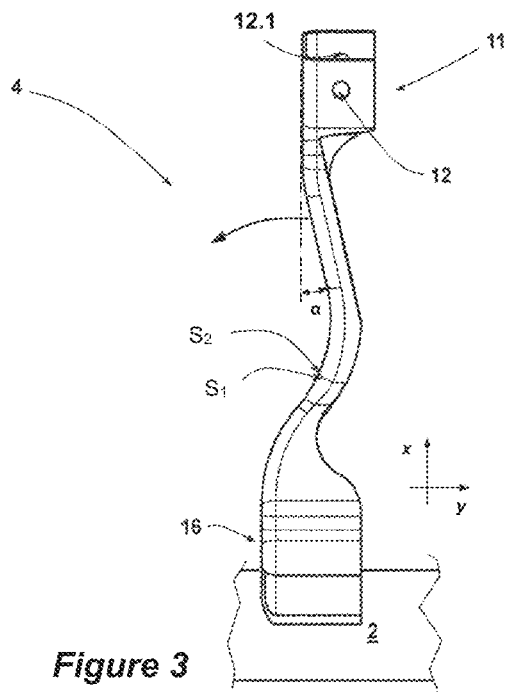
FIG. 3 shows a top view of the mount of FIG. 2.
Figure 4:
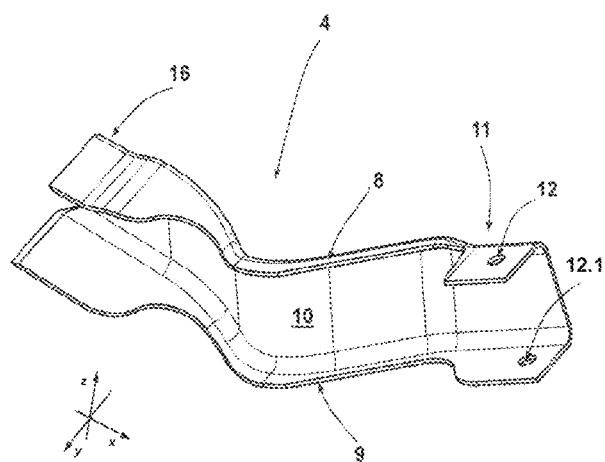
FIG. 4 shows a perspective view of the mount of the preceding figures.

As can be seen from the top view in FIG. 3, the mount 4 is curved in an S-shape in the x-y plane, as a result of which a flexure is formed. The offset of the flexure faces in the y direction. In the alignment (x direction) of the mount sections offset in relation to one another by the flexure, they do not overlap. This geometry provides a predetermined bending point $S_2$ in the mount 4, in which the mount 4 bends in the y direction when the display 5 is subjected to a corresponding force in the x direction toward the crossbeam 2. The bending axis of this predetermined bending point $S_2$ extends in the z direction.

The crossmember connection-side mount section adjoins the crossmember 2 at right angles in the y-z plane. The connection-side mount section spaced apart from this mount section by the predetermined bending point $S_2$ is inclined in relation to this connection direction, specifically in the example embodiment shown at an angle α of approximately 14°. This inclination, which is provided against the offset direction of the flexure, is used as a specification for activating the predetermined bending point $S_2$.

The mount 4 thus has predetermined bending points $S_1$, $S_2$, by means of which it can bend in two directions for energy absorption.

In the case of the mount 4, the height of the web 10 is reduced in the transition to the end sections which are widened with respect to its limbs 8, 9 (see in particular FIG. 2). In the example embodiment shown, this reduction in height takes place exclusively in the region of the upper limb 8 of the mount 4 in the form of a flexure. This flexure, which is executed on a short distance, has a stiffening effect, so that the force coupled into the mount 4 via the display 5 is passed on to the predetermined bending points $S_1$, $S_2$. In the region of the crossmember connection 16, this flexure, which is designed in the manner of a cranked portion, also has the effect of displacing the actual buttress in the direction toward the predetermined bending points $S_1$, $S_2$.

The mount 4 divided into its two mount sections by the two predetermined bending points $S_1$, $S_2$ is designed such that the mount section having the crossmember connection 16 is the shorter mount section. As a result, the lever exerted on the predetermined bending points $S_1$, $S_2$ by the instrument connection-side mount section is correspondingly greater.

With this concept, the forces required for bending can be adjusted to the respective vehicle-related application, for example by appropriate adaptation of the width of the limbs 8, 9, the specification provided by the flexure, or the height of the web 10, to name only the major influencing variables. Therefore, the mounts 4, 4.1 of the mounting 3 can be adjusted very exactly to the forces to be absorbed in case of an accident. The use of two mounts 4, 4.1 also allows them to be designed differently in terms of their crash performance, for example because the driver-side mount is located behind the steering wheel in the x direction and a different crash performance is therefore desired on this side of the display than that on the passenger end of the display.

The mounts 4, 4.1 of the assembly 1 have a relatively small height on the instrument connection side. In conjunction with the connection of the mounts 4, 4.1 in the region of the lower end 7 of the display 5, this provides a relatively large lever, using which the display 5 is adjusted in the region of its upper end 6 in the event of an accident-related acceleration load.

The above-described design of the mounts 4, 4.1 of the mounting 3 makes it clear that a tensile force acting on the upper end 6 of the display 5 does not result in a deformation of the mounts 4, 4.1, at least not with a force which is coupled into the displayed 5 in the event of a misuse by using the upper end 6 of the display 5 as a handle to stand up.

The mounts described in the example embodiment with reference to the figures are produced from a steel plate. It is obvious that other materials, such as aluminum alloys, can also be used instead of this material. The use of non-metallic materials is of course also possible.

The invention has been described on the basis of an example embodiment with reference to the figures. Without departing the scope of the claims, numerous further design options result for a person skilled in the art, without having to explain or show them in greater detail in the context of this disclosure.

LIST OF REFERENCE SIGNS 1 assembly
2 dashboard crossmember
3 mounting
4, 4.1 mount
5 display
6 upper end
7 lower end
8 upper limb
9 lower limb
10 web
11 connection side
12, 12.1 passage
13 press-in nut
14 connection part
15 concave section
16 crossmember connection
α angle

The invention claimed is:

1. An assembly for a vehicle, comprising:
a crossmember for connecting to two pillars lying opposite each other with respect to an x-z plane of the vehicle,
a mounting connected to the crossmember and protruding therefrom in a radial direction, the mounting comprising two mounts, which are spaced apart from one another in a y direction, and end-face connection means, and
a panel-shaped instrument connected to the connection means of the mounting at a distance from an upper end of the panel-shaped instrument, wherein the panel-shaped instrument is mounted such that a user interface of the instrument faces in an x direction into a passenger compartment of the vehicle,
wherein each of the two mounts is designed in the form of a half shell which are arranged such that an opening side thereof faces in the y direction, wherein each half shell has two limbs connected by a web, with the two limbs arranged on an x-y plane and the web arranged on a y-z plane, and wherein each of the mounts has at least one predetermined bending point, which is provided by a geometry of the mount, between the two connection sections of the mount, the mounts configured to bend at the predetermined bending point in a z and/or y direction in the event of a load in the x direction.

2. The assembly of claim 1, wherein the mounts each have a predetermined bending point at which the mounts bend in the z direction under load in the x direction.

3. The assembly of claim 1, wherein the mounts each have a predetermined bending point at which the mounts bend in the y direction under load in the x direction.

4. The assembly of claim 3, wherein the mounts in a projection thereof in the x-y plane have a flexure pointing in the y direction with an offset such that two mount sections offset from one another by the flexure do not overlap in the alignment of their longitudinal extension in the y direction.

5. The assembly of claim 4, wherein the mount sections carrying the connection means for the panel-shaped instrument are inclined against an offset direction of the flexure.

6. The assembly of claim 5, wherein the angle of inclination is between 12° and 18°.

7. The assembly of claim 1, wherein, to form a predetermined bending point at which a mount bends in the z direction in the event of load in the x direction, the mount has a section that is concave in the direction of its longitudinal extension with an apex axis which extends in the y direction.

8. The assembly of claim 1, wherein, due to the geometry in the design of the mounts, the mounts have a higher flexural rigidity at a distance from the at least one predetermined bending point in the direction of their crossmember connection than in a region of a predetermined bending point.

9. The assembly of claim 8, wherein, to increase the flexural rigidity of the mounts, a width of the limbs located in the x-y plane increases in the direction of the crossmember connection.

10. The assembly of claim 1, wherein a height of the web connecting the limbs of the half shell is reduced adjacent the two connection sections of the mounts in comparison to mount sections located therebetween.

11. The assembly of claim 10, wherein the height of the web is reduced by a flexure of the upper limb of the mounts introduced in the y-z plane.

12. The assembly of claim 1, wherein the lower limbs of the mounts located in the x-y plane each carry a press-in nut on an outside thereof as connection means for fixing a fastening bolt, and a shaft of the fastening bolt extends through a passage in the upper limb located in the x-y plane and a connecting part of the panel-shaped instrument arranged between the upper and lower limbs of the mount located in the x-y plane.

13. The assembly of claim 1, wherein the mounts are produced as stamped and bent parts from a steel plate.

14. The assembly of claim 1, wherein the panel-shaped instrument is a display.

* * * * *